(12) United States Patent
Afghahi

(10) Patent No.: US 6,717,128 B2
(45) Date of Patent: Apr. 6, 2004

(54) OFFSET REDUCTION IN IMAGE SENSORS

(75) Inventor: Morteza Afghahi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/310,497

(22) Filed: Dec. 4, 2002

(65) Prior Publication Data

US 2003/0080279 A1 May 1, 2003

Related U.S. Application Data

(63) Continuation of application No. 09/989,877, filed on Nov. 20, 2001, now Pat. No. 6,555,805, which is a continuation of application No. 09/374,795, filed on Aug. 16, 1999, now Pat. No. 6,384,394.

(51) Int. Cl.$^7$ ................................................ H01J 40/14
(52) U.S. Cl. ................................. 250/208.1; 348/308
(58) Field of Search .......................... 250/208.1, 214 R, 250/214 C; 348/294, 298, 301, 303, 308, 241, 243, 264

(56) References Cited

U.S. PATENT DOCUMENTS

| | | | |
|---|---|---|---|
| 5,633,679 A | 5/1997 | Hosier et al. | |
| 5,900,623 A | 5/1999 | Tsang et al. | |
| 6,118,115 A | 9/2000 | Kozuka et al. | |
| 6,311,895 B1 | 11/2001 | Olmstead et al. | |
| 2003/0184666 A1 * | 10/2003 | Jo | 348/308 |

* cited by examiner

Primary Examiner—Kevin Pyo
(74) Attorney, Agent, or Firm—Blakely, Sokoloff, Taylor & Zafman LLP

(57) ABSTRACT

A method is disclosed for reducing an offset for an image sensor. According to an embodiment of the invention, an offset for the image sensor is determined. A level of a reset voltage for the image sensor is adjusted based at least in part on the offset. The offset is reduced by applying the reset voltage to the image sensor.

29 Claims, 3 Drawing Sheets

OFFSET REDUCTION IN IMAGE SENSORS

CROSS-REFERENCE TO RELATED APPLICATIONS

This application is a continuation of U.S. patent application Ser. No. 09/989,877, filed Nov. 20, 2001 now U.S. Pat. No. 6,555,805, which is a divisional of U.S. patent application Ser. No. 09/374,795, filed Aug. 16, 1999 now U.S. Pat. No. 6,384,394, both applications being assigned to the assignee of the present application.

BACKGROUND OF THE INVENTION

1. Field of the Invention

The present invention relates to the field of imaging. More precisely, the present invention relates to pixels of image sensors.

2. Background of the Invention

Imaging arrays, used to produce images representing objects, are typically formed of rows and columns (bitlines) of photo detectors (pixels). The pixels generate photo charges proportional to light reflected from an object to be imaged. Photo charges from each, pixel are converted to a signal (charge signal) or potential representative of a level of energy reflected from a respective portion of the object. The signal or potential is read and processed by video processing circuitry to create an image representing an object.

Pixels belonging to a same bitline are usually connected at a common output node from where a signal or potential, representative of the level of energy, is read out. Pixels belonging to the same bitline "see" an overall capacitance (hereinafter referred to as "bitline capacitance"), at the common output node. Each pixel in a same bitline is individually controlled to read out at the common output node. Typically, pixels belonging to a same row are commonly controlled by a same signal (wordline) such that an entire row may be read out at a substantially same time.

To meet the increasing need for high-speed image sensor devices, image sensor arrays are integrated with digital circuitry that controls the operation of the array and processes the array's output. Integration of image sensors with complementary-metal-oxide-semiconductor (CMOS) support circuitry is most desirable because of the low power consumption characteristics and common availability of CMOS technology. Such an imaging array integrated with CMOS support circuitry is called CMOS active pixel sensor (APS) array.

Typically, a pixel includes a photosensor that detects light impinging thereon and "converts" the light into an electronic signal indicative of an intensity of light detected by the pixel. A driving device receives the electronic signal and drives a current proportional to the electronic signal to a bitline to which the pixel is coupled. Then the pixels in a selected row are accessed by asserting the WORDLINE signal to each pixel access device of each pixel cell of a selected row. Then each bitline to which a corresponding pixel of the selected row is coupled, may be charged by a current driven by the driving device of the pixel to a voltage level representative of an intensity of light detected by that pixel. The pixels of an entire row may thus be read out at a substantially same time. The pixel cells of other rows, not currently accessed, have their pixel access devices switched off by deasserting the wordline signals corresponding to these rows.

One of the problems in active image sensor arrays is offset. Offset in the voltage readout from the pixel may be due to leakage and offset in the read out circuit (source follower), correlated double sampling, and analog-to-digital converter. FIG. 1 is a diagram that illustrates several waveforms representing the output signal of a pixel of a CMOS sensor array. Waveform 102 represents the output voltage in an ideal case where offset is not present. Waveform 104 is a waveform representing the output voltage where an offset $V_{off}$ is present. The offset may be amplified by a gain stage giving rise to waveform 106. Note that, since the voltage range for waveform 104 is positive, so will be the voltage range for waveform 106. The offset therefore causes a reduction in the output swing and thereby a reduction in a dynamic range.

SUMMARY OF THE INVENTION

In one embodiment, the present invention includes a circuit for offset reduction in an active pixel sensor array. The circuit includes a voltage regulator to regulate a reset voltage at an output port of the voltage regulator for a pixel of the active pixel sensor array. The circuit further includes at least one programmable circuit, coupled to the voltage regulator, to adjust the reset voltage and reduce the offset by a first value.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

One embodiment of the present invention includes a circuit for offset reduction in an active pixel sensor array. In this circuit, offset is reduced by adjusting the reset voltage. The circuit includes a voltage regulator to regulate a reset voltage applied to a pixel of an active pixel sensor array. The circuit further includes at least one programmable circuit coupled to the regulator, to adjust the reset voltage and reduce the offset by a first value. By way of at least one programmable circuit, the offset may be reduced, if not canceled, by desired values.

Figure 1:
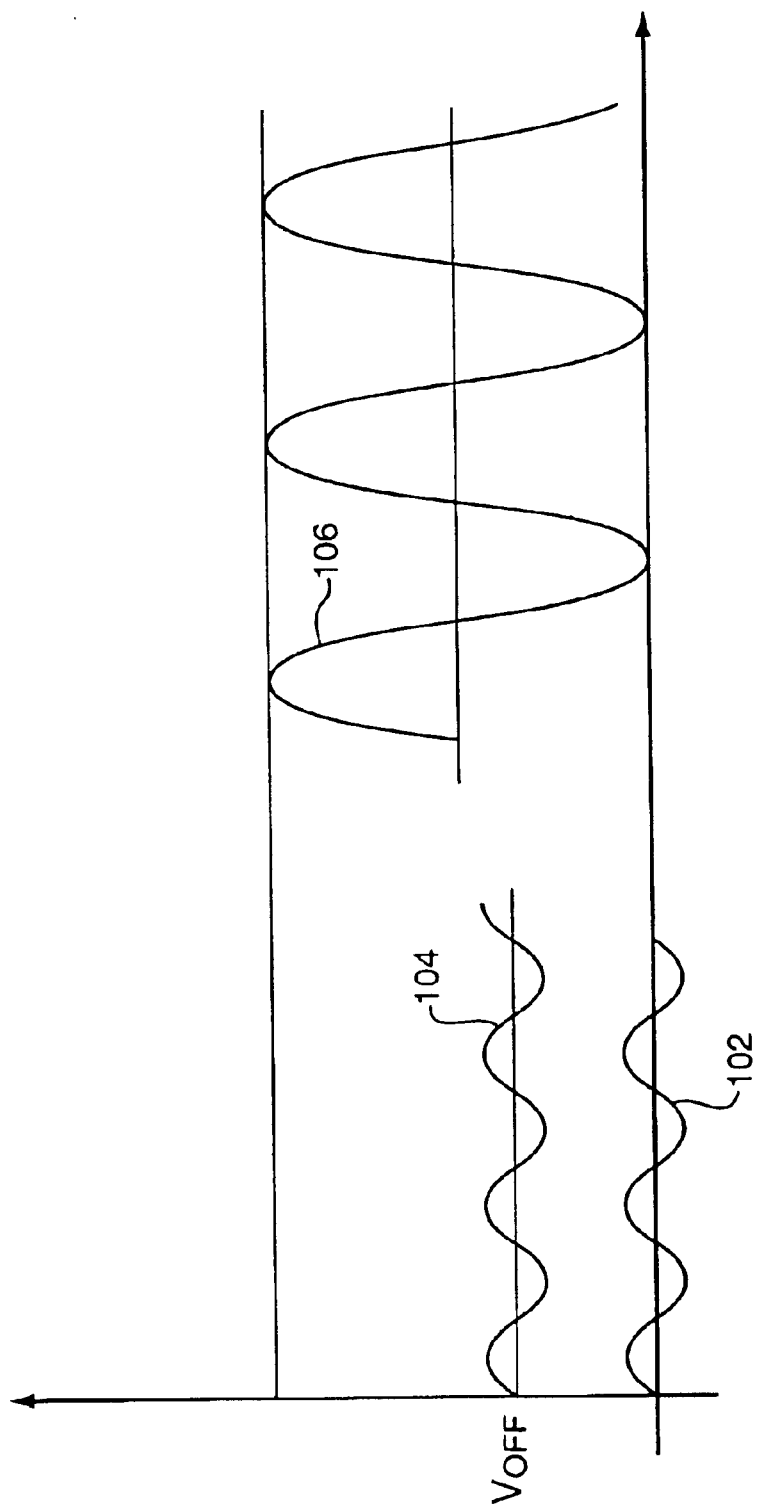
FIG. 1 illustrates a diagram with several waveforms representing the voltage at the output of a pixel cell.
Figure 2:
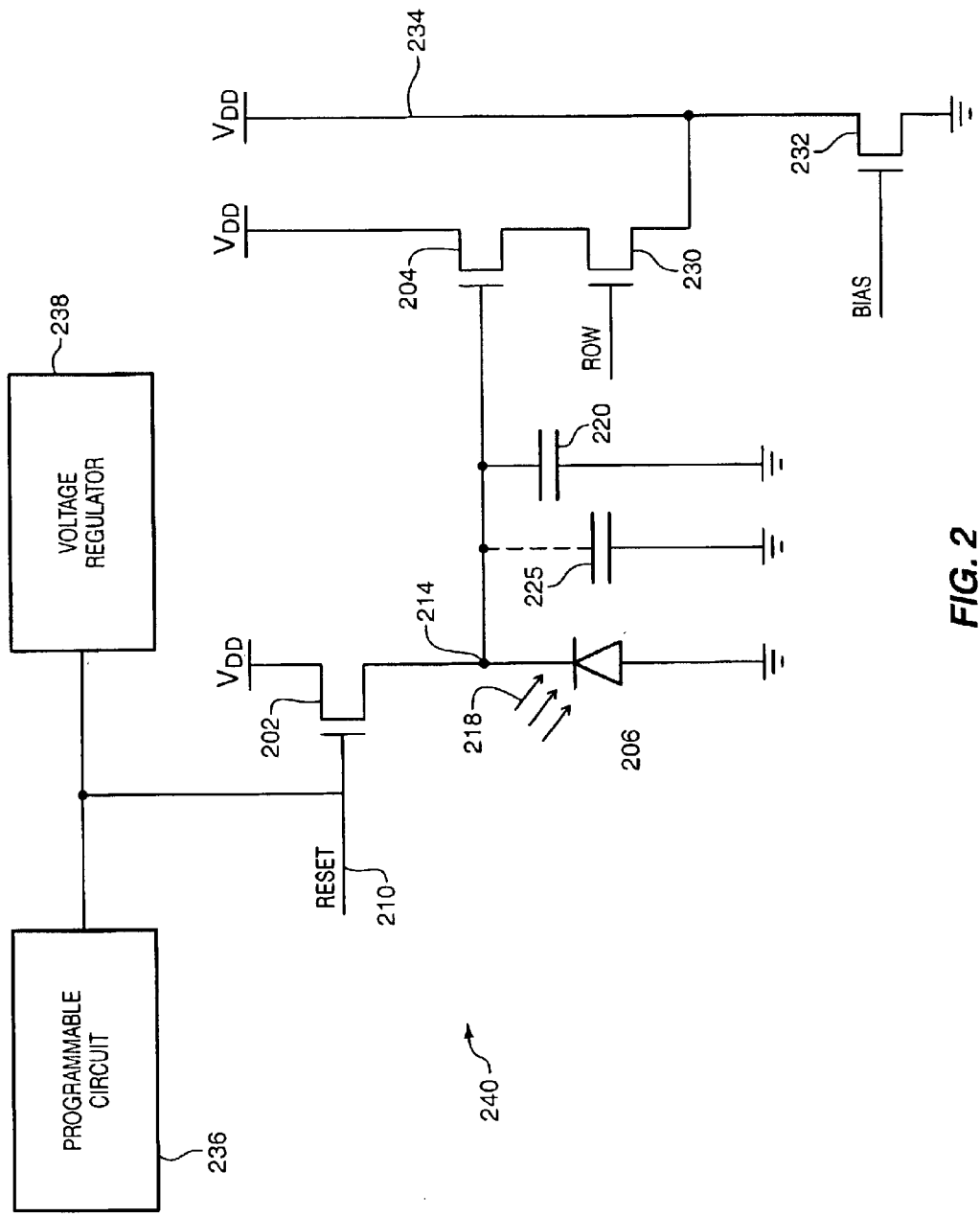
FIG. 2 illustrates a circuit for offset reduction coupled to a pixel of an active pixel sensor array.

FIG. 2 illustrates an embodiment of a pixel cell 240 shown in dotted line coupled to voltage regulator 238 and to a programmable circuit 236 according to one embodiment of the present invention. Pixel cell 240 (hereinafter referred to as "pixel") includes a photosensor such as photodiode 206, onto which light 218 impinges. Pixel 240 further includes a reset transistor 202 coupled to a reset line 210. In one embodiment, the reset transistor 202 may be implemented as an N-Channel Metal Oxide Semiconductor Field Effect Transistor (NMOSFET). Reset transistor 202 has a drain thereof coupled to a supply voltage $V_{dd}$, a gate thereof coupled to the reset line 210, and the source thereof coupled to node 214, which is coupled to a cathode of photodiode 206.

Initially, before light 218 is integrated onto photodiode 206, a reset signal is asserted to the gate of the reset transistor 202 via reset line 210 at a voltage of approximately the supply voltage $V_{dd}$ less the threshold voltage of the reset transistor 202. The assertion of the reset signal turns transistor 202 ON, causing capacitor 220 to be charged to approximately 3.3 volts (this value representing a dark or reset condition). As light is integrated into photodiode 206, capacitor 220 is discharged through photodiode 206, causing the voltage at node 214 to drop down from 3.3 volts to a voltage value V. The voltage difference between 3.3 volts and V reflects the intensity of the light detected by photodiode 206.

Initially, all the pixels of the array of which pixel 240 is a part, are globally reset. After integration, the array is read out one row at a time by asserting a row select signal to the gate of the row select transistor 230. During the process of reading out a row, the signal is read out and stored on the first capacitor. Then the pixel is reset. This time only the row that contains that pixel is reset. Then, the reset value for the respective row is read out and stored on a second capacitor 225. The integrated signal is equal to the difference between the values of the signal stored in the first capacitor 220 and the second capacitor 225. The drain of row select transistor 230 is coupled to Vdd by line 234 and to the source of a bias transistor 232. The source of row select transistor 230 is coupled to the drain of a transistor 204. The source of transistor 204 is coupled to Vdd and the gate of transistor 204 is coupled to node 214. Due to variations in the supply voltage $V_{dd}$, offsets may occur causing a reduction of the input swing as explained above. To cancel this offset, the embodiment of the programmable circuit 236 of the present invention is configured to adjust the reset voltage asserted through line 210 to the reset transistor 202 as explained hereinafter.

Figure 3:
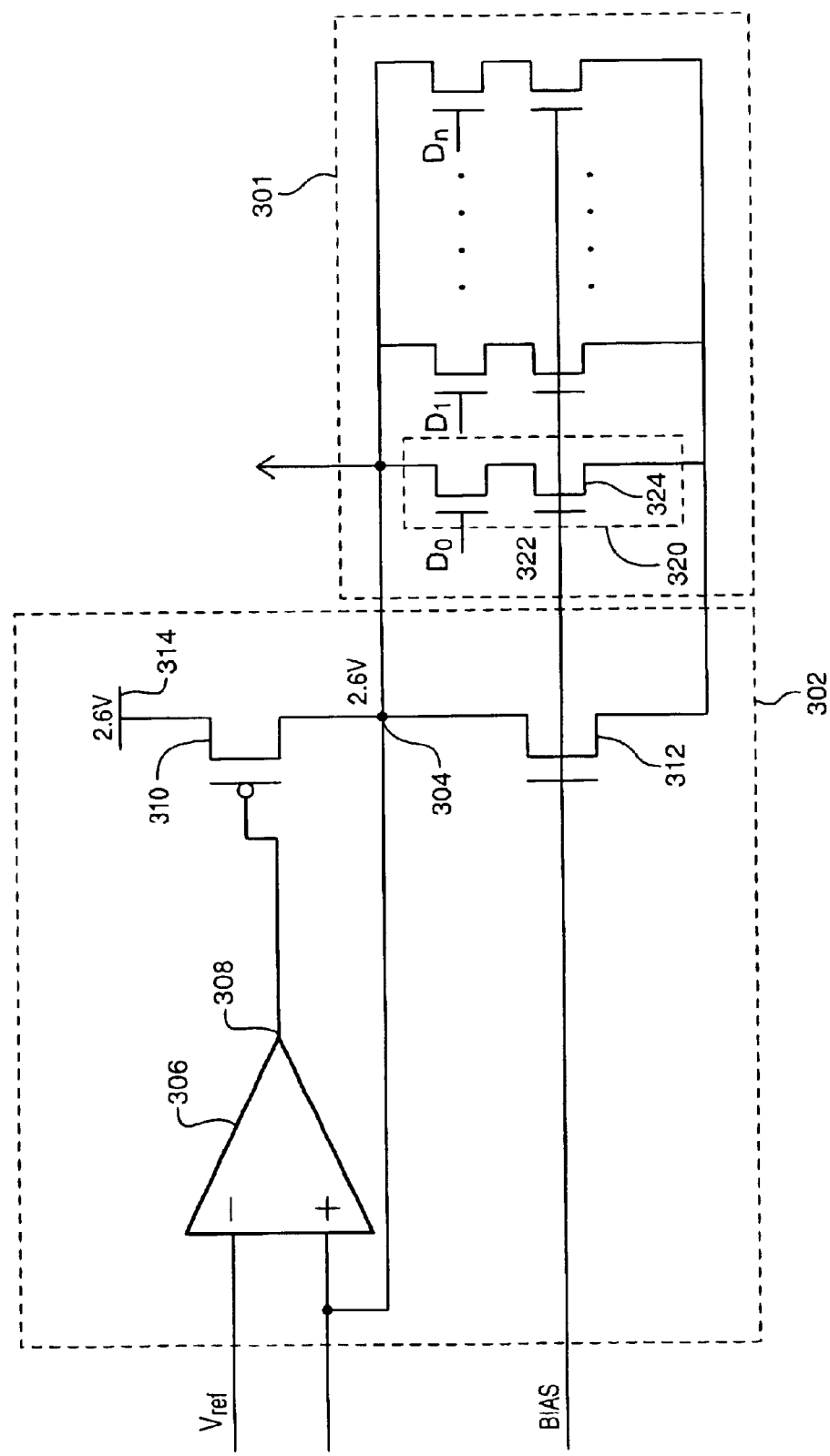
FIG. 3 illustrates an embodiment of a circuit for offset reduction according to the present invention.

FIG. 3 illustrates an embodiment of a circuit for offset reduction 300 according to the present invention. Circuit 300 includes a voltage regulator 302, shown within dotted lines, coupled to a programmable circuit 301. The voltage regulator 302 regulates a reset voltage, at an output node 304 of the voltage regulator. The reset voltage is applied to the reset transistor 202 shown in FIG. 2. By "regulating the voltage applied to the reset transistor" is understood preventing the voltage at node 304 from varying with the power supply.

Voltage regulator 302 includes an operational amplifier 306 that receives at the negative input thereof a reference voltage $V_{ref}$ which represents the value of the reset voltage in the ideal case where the noise does not effect the reset voltage. In one embodiment of the present invention $V_{ref}$ equals 2.6 volts, but the present invention is not limited in scope to this voltage value. The operational amplifier 306 has an output port thereof 308 coupled to a gate of P channel MOSFET transistor 310. The P-MOSFET 310 is coupled at a source thereof to a supply voltage 314 such as the voltage of a power supply, utilized for the CMOS pixel sensor array. The supply voltage is set to approximately 2.6 volts. The operational amplifier 306 is coupled in a feedback configuration at the positive input thereof to a drain of transistor 310. The drain of transistor 310 coincides with the output node 304. The voltage regulator 302 further includes a bias transistor 312 coupled to the output node 304.

When the voltage at the output node 304 is not equal to the desired reset value of 2.6 volts, due to noise at the power supply 314, for example, the feedback loop of the operational amplifier 306 causes the voltage at output node 304 to return back to approximately 2.6 volts. Assume that the voltage at output node 304 is higher than 2.6 volts. In this case operational amplifier 306 generates at its output port 308 a voltage value large enough to cause transistor 310 to conduct less current. As a result, the voltage at output node 304 drops. By contrast, when the voltage at the output node 304 is below 2.6 volts, the operational amplifier 306 generates at the output port thereof 308 a smaller voltage value, if not a negative voltage value. The smaller voltage value causes transistor 310 to conduct more current pulling output node 304 closer to 2.6 volts.

The circuit for offset reduction 300 further includes at least one programmable circuit 320 (shown within dotted line as $D_0$). In the embodiment of the present invention described herein, there are a plurality of programmable circuits 301 shown within dotted line as $D_0$ through $D_n$. Each programmable circuit includes a programmable device 322 and bias device 324. In one embodiment of the present invention described herein, the programmable device 322 is an active device implemented as an N channel MOSFET and so is bias device 324, but the present invention is not limited in scope to this implementation.

The circuit for offset reduction illustrated in FIG. 3 may work in connection with a pixel of an active pixel sensor array such as pixel 240 illustrated in FIG. 2 with the reset line 210 coupled to the reset transistor 202. Initially, for the readout operation of the sensor array, all the array is first globally reset. That means that every reset transistor of each pixel of the array receives a same voltage value that may be approximately 2.6 volts in one embodiment according to the present invention. After the global reset operation, integration takes place. Then the array is read out one row at a time. For each pixel of the row an electrical signal (voltage) indicative of an intensity of the light impinging on the respective pixel is read out. Then the pixels of the respective row being read out are locally reset by way of circuit for offset reduction 300 of FIG. 3.

Typically there are an even number of programmable circuits 320 coupled to output node 304. When the global reset is asserted, circuit 300 is configured in a default state where a first half of the programmable circuits have their active devices turned on, i.e., the voltage at the gate of programmable device 322 is set to logic 1. A second half of the active devices of the programmable circuits are off, i.e., for each programmable circuit of this second half of active devices, the voltage asserted to the gate of programmable device 322 is logic 0.

During the local reset phase, the plurality of programmable circuits 301 are programmed to produce a reset voltage value at node 304 such that an offset in the voltage signal read out from the pixels after integration is reduced by a first value which may be a desired predetermined value. For instance, if the offset is in the positive direction, causing the voltage signal read out from the pixels after integration to be larger, the reset voltage at node 304 is reduced to reduce the voltage signal read out from the pixels. Such reduction in the reset voltage is achieved by programming the plurality of programmable circuits 301 such that there are more programmable circuits that are on than programmable circuits that are off, thereby causing a discharge in the voltage at node 304. The greater the offset is, the more programmable circuits in the plurality of programmable circuits 301 are active. Similarly, if the voltage read out from the pixels is affected by a negative offset then the plurality of programmable circuits 301 are programmed in such a way that more of the programmable circuits will be turned off than on.

Typically, the offset may be determined by reading certain histograms that describe the behavior of the output voltage and, therefore, offer an indication of the offset. The histogram can be measured at different known light intensities. For example at dark one expects the average of the histogram to be around 0. If the average of the histogram is not placed at 0, the displacement of the histogram indicates offset. Based on the offset, a signal is driven to the programmable circuits to make an adjustment for the offset.

In the foregoing specification, the invention has been described with reference to specific embodiments thereof. It will however be evident that various modifications and changes can be made thereto without departing from the broad spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   determining an offset for an image sensor;
   adjusting a level of a reset voltage for the image sensor based at least in part on the offset for the image sensor; and
   reducing the offset for the image sensor by applying the reset voltage to the image sensor.

2. The method of claim 1, wherein determination of the offset for the image sensor comprises reading a signal value from the image sensor and comparing the signal value to an expected value.

3. The method of claim 1, wherein adjusting the level of the reset voltage includes programming a plurality of programmable circuits configured to sink currents from a reset node, the reset voltage being present at the reset node.

4. The method of claim 3, wherein the plurality of programmable circuits comprises an even number of programmable circuits.

5. The method of claim 4, wherein each of the plurality of programmable circuits comprises a programmable device and a bias device.

6. The method of claim 4, wherein at an equilibrium point a first half of the plurality of programmable circuits are on and a second half of the plurality of programmable circuits are off.

7. A method comprising:
   resetting an imaging array, the imaging array being comprised of a plurality of pixels;
   determining an offset voltage for a first pixel in the imaging array by comparing a signal value for the pixel to an expected value; and
   reducing the offset voltage by adjusting a reset voltage for the pixel.

8. The method of claim 7, wherein resetting the image sensor includes applying a voltage to a reset transistor for each pixel in the image sensor.

9. The method of claim 7, further comprising regulating the reset voltage for the imaging array by comparing the reset voltage for the imaging array to a reference voltage.

10. The method of claim 9, wherein determining the offset voltage for the first pixel comprises producing a histogram of the output voltages of the plurality of pixels.

11. The method of claim 10, wherein producing a histogram comprises obtaining outputs from the imaging array for a known light intensity.

12. The method of claim 11, wherein adjusting the reset voltage for the first pixel includes programming a plurality of programmable devices, the programming being based at least in part upon the offset voltage for the first pixel.

13. The method of claim 12, wherein each programmable device is coupled to a reset node and wherein each programmable device sinks current from the reset node when the programmable device is active.

14. The method of claim 13, wherein the plurality of programmable devices comprises an even number of programmable devices.

15. The method of claim 14, wherein in a default state a first half of the programmable devices are active and a second half of the programmable devices are inactive.

16. The method of claim 15, wherein if a positive offset voltage is detected, the number of programmable devices that are active is increased from the number of programmable devices that are active during the default state.

17. The method of claim 16, wherein if a negative offset voltage is detected, the number of programmable devices that are active is decreased from the number of programmable devices that are active during the default state.

18. A method comprising:
   resetting an array of pixels;
   sensing light with the array of pixels, an intensity of the light being known;
   determining an offset voltage in a voltage signal of a first pixel in the array of pixels, the determination of the offset voltage comprising comparing the voltage signal to an expected value; and
   adjusting a current that is sunk from a reset node based upon the offset voltage.

19. The method of claim 18, wherein resetting the array of pixels comprises applying the same voltage to each pixel in the array of pixels.

20. The method of claim 18, wherein determining an offset voltage includes producing a histogram of signals from the array of pixels.

21. The method of claim 18, wherein adjusting the current that is sunk from the reset node includes programming a circuit.

22. The method of claim 21, wherein the circuit is comprised of a plurality of programmable devices.

23. The method of claim 22, wherein each of the plurality of programmable device is coupled to the reset node and wherein each of the plurality of programmable devices sinks current from the reset node when the programmable device is turned on.

24. The method of claim 23, wherein at a zero offset point one-half of the plurality of programmable devices are on and one-half of the programmable devices are off.

25. The method of claim 24, wherein a positive offset voltage results in turning on more than half of the plurality of programmable devices.

26. The method of claim 25, wherein a negative offset voltage results in turning off more than half of the plurality of programmable devices.

27. A method comprising:
   resetting a first pixel in an array of pixels using a global reset signal;
   activating the pixel when the array of pixels is illuminated by light of a known intensity;
   reading a signal value for the first pixel;
   determining an offset for the first pixel, the offset for the first pixel being determined at least in part by comparing the signal value to an expected value;
   establishing a first reset voltage for the first pixel, the first reset voltage being established at least in part based on the offset for the first pixel; and resetting the first pixel using a reset signal set at the first reset voltage.

28. The method of claim 27, wherein the reset signal is set at the first reset voltage by activating a first portion of a plurality of programmable devices.

29. The method of claim 28, wherein half of the plurality of programmable devices are activated for the global reset signal.

* * * * *